(12) United States Patent
Eisner et al.

(10) Patent No.: US 8,904,471 B1
(45) Date of Patent: Dec. 2, 2014

(54) POLICY SYSTEM FOR E-PROCUREMENT (75) Inventors: Noah Eisner, Menlo Park, CA (US);
Dave Stephens, Half Moon Bay, CA (US); David Williams, Oakland, CA (US); Seggy Umboh, Oakland, CA (US)

(73) Assignee: Coupa Software Incorporated, Foster City, CA (US)

( * ) Notice: Subject to any disclaimer, the term of this patent is extended or adjusted under 35 U.S.C. 154(b) by 1784 days.

(21) Appl. No.: 12/079,821

(22) Filed: Mar. 28, 2008

Related U.S. Application Data (60) Provisional application No. 60/920,889, filed on Mar. 30, 2007, provisional application No. 60/821,104, filed on Mar. 30, 2007, provisional application No. 60/921,152, filed on Mar. 30, 2007, provisional application No. 60/921,116, filed on Mar. 30, 2007, provisional application No. 60/920,976, filed on Mar. 30, 2007, provisional application No. 60/921,218, filed on Mar. 30, 2007, provisional application No. 60/920,888, filed on Mar. 30, 2007, provisional application No. 60/921,055, filed on Mar. 30, 2007.

(51) Int. Cl.
*G06F 17/00* (2006.01)
*G06F 7/04* (2006.01)
*G06F 15/16* (2006.01)
*G06F 17/30* (2006.01)
*H04L 29/06* (2006.01)
*G06Q 10/08* (2012.01)
*G06Q 30/06* (2012.01)

(52) U.S. Cl.
CPC .......... G06Q 10/087 (2013.01); G06Q 30/0601 (2013.01)
USPC .................................................. 726/1; 726/4

(58) Field of Classification Search
CPC ............ G06Q 10/087; G06Q 30/0607; G06Q 30/0601; G06Q 30/0603
USPC ................................ 726/1, 4; 705/26.1–27.2
See application file for complete search history.

(56) References Cited

U.S. PATENT DOCUMENTS 5,315,504 A    5/1994  Lemble
5,319,542 A    6/1994  King, Jr. et al.
(Continued)

OTHER PUBLICATIONS

McCrea, P., "Trends in Electronic Procurement," Office of Information Technology NSW Government, Dec. 1997 (40 pages).

(Continued)

*Primary Examiner* — Philip Chea
*Assistant Examiner* — Trong Nguyen
(74) *Attorney, Agent, or Firm* — Hickman Palermo Truong Becker Bingham Wong LLP (57) ABSTRACT

A method for utilizing a policy system in the requisitioning of goods or services over a network, the network connected to a server, thereby allowing communication between the server and a plurality of users, each user having a login ID and belonging to one of a plurality of classes, the method comprising: the server storing each user's login ID, each user's class information, and a plurality of policies, wherein the class information comprises the identification of each class to which the user belongs, and each policy is associated with a class; a user logging into the server using the user's login ID; the user providing search input to the server; the server processing the search input; the server determining the appropriate policies, wherein the appropriate policies are policies that are determined to be associated with the user's class information; and the server providing the appropriate policies to the user.

20 Claims, 4 Drawing Sheets

(56) References Cited

U.S. PATENT DOCUMENTS

| | | | |
|---|---|---|---|
| 5,758,327 A | | 5/1998 | Gardner et al. |
| 5,970,475 A | * | 10/1999 | Barnes et al. ............... 705/26.35 |
| 7,082,408 B1 | | 7/2006 | Baumann et al. |
| 7,110,976 B2 | | 9/2006 | Heimermann et al. |
| 7,480,627 B1 | * | 1/2009 | Van Horn et al. ............ 705/26.2 |
| 7,533,042 B2 | | 5/2009 | Shuder et al. |
| 8,032,597 B2 | | 10/2011 | Khoo |
| 2002/0107713 A1 | | 8/2002 | Hawkins |
| 2002/0138658 A1 | | 9/2002 | Sjostrom et al. |
| 2002/0143692 A1 | | 10/2002 | Heimermann et al. |
| 2003/0149730 A1 | | 8/2003 | Kumar et al. |
| 2006/0036507 A1 | | 2/2006 | Pujar et al. |
| 2007/0011258 A1 | | 1/2007 | Khoo |
| 2008/0005247 A9 | | 1/2008 | Khoo |

OTHER PUBLICATIONS

No Author, "Requisition Approval," University of Maine System, Jul. 6, 2005 (19 pages).

United States General Accounting Office, "Report to Congressional Committees, Acquisition Reform, Purchase Card Use Cuts Procurement Costs, Improves Efficiency", B-271689, Dated Aug. 6, 1996, 22 pages.

* cited by examiner

POLICY SYSTEM FOR E-PROCUREMENT

CROSS-REFERENCE TO RELATED APPLICATIONS

This application claims priority to U.S. Provisional Application Ser. Nos. 60/920,889, 60/821,104, 60/921,152, 60/921,116, 60/920,976, 60/921,218, 60/920,888, and 60/921,055, all of which were filed on Mar. 30, 2007, and all of which are hereby incorporated by reference as if set forth herein.

FIELD OF THE INVENTION

The present invention relates generally to the field of electronic procurement of goods and services. More specifically, the present invention relates to a system and method for storing purchasing policies and for influencing purchasing decisions based on these policies.

BACKGROUND OF THE INVENTION

For the purposes of this disclosure, the term "item" should be interpreted to refer to a good or a service. E-procurement web sites allow qualified and registered users to look for buyers or sellers of desired goods and services using a purchasing system. Users can navigate through the web site to find the desired items and submit a requisition order. However, companies typically have policies with respect to a company member purchasing an item. A policy is a definite course of action or procedure (or multiple courses of action or procedures) that is deemed acceptable by the company for guiding and determining present and future decisions and/or actions. Policies can determine who is able to buy what, and how he or she should be buying it. Policies can also provide guidelines for a peripheral or downstream process related to a purchase, such as a policy on returning goods or services, rather than simply relating to only the purchasing process itself. While companies can make policy documents available to company members, these policies are not connected to the execution system of ordering items. Rather, they are kept separate from the purchasing process. For example, if a company member is performing a search on an item category, such as cell phones, the company member is not provided with the company policy as a result of the search. As a result, it is quite easy for a company member to make a purchasing decision and execute a purchase order for an item without being aware of the company's policy regarding the item or that specific company member. What is needed in the art is a method and system for providing policies to company members in an easy and efficient manner.

SUMMARY OF THE INVENTION

The present invention incorporates policies into the purchasing system, thereby providing a new, useful and non-obvious method for storing purchasing policies in a system and influencing buying decisions based on those policies. The policies are expressions of what a user, such as an organization member, can and/or cannot do with respect to the requisitioning of items, or any peripheral or downstream process such as discussed above. These expressions can take a variety of forms, including, but not limited to, text, images, links, or any combination thereof. Preferably, these expressions are provided through the employment of HyperText Markup Language (HTML) coding. However, it is contemplated that a variety of other means can be used in addition or as an alternative to HTML in order to enable a policy author to make a policy viewable to an organization member on a computer display.

In one embodiment of the present invention, a method for utilizing a policy system in the requisitioning of items over a network is disclosed. The network is connected to a server, thereby allowing communication between the server and a plurality of users. Each user has a login ID and belongs to at least one of a plurality of classes. The method comprises the server providing a requisitioning system to the plurality of users, wherein the users can search for and requisition items using the requisitioning system. The server stores each user's login ID, each user's class information, and a plurality of policies. A user's class information comprises the identification of each class to which the user belongs, and each policy is associated with at least one class and comprises one or more guidelines regarding the requisitioning of an item. A user logs into the server from a client machine using the user's login ID. The user then provides search input to the server from the client machine. The server processes the search input and then determines the appropriate policies. The appropriate policies are policies that are determined to be associated with the user's class information. The server provides the appropriate policies to the user, with the appropriate policies being viewable on the user's client machine.

In another embodiment, a program storage device is disclosed. The device is readable by a machine and tangibly embodies a program of instructions executable by the machine to perform a method for utilizing a policy system in the requisitioning of items over a network. The network is connected to a server, thereby allowing communication between the server and a plurality of users, with each user having a login ID and belonging to at least one of a plurality of classes. The method comprises the machine providing a requisitioning system to the plurality of users, wherein the users can search for and requisition items from a plurality of items using the requisitioning system. The machine stores each user's login ID, each user's class information, and a plurality of policies. A user's class information comprises the identification of each class to which the user belongs, and each policy is associated with at least one class and comprises one or more guidelines regarding the requisitioning of an item. The method further comprises the machine receiving search input from a user logged into the machine from a client computer, and the machine processing the search input. The machine determines the appropriate policies in response to the processing of the search input. The appropriate policies are the policies that are determined to be associated with the user's class information. In other words, the user's class (i.e., business group) determines which policies are available for viewing by the user. Finally, the machine provides the appropriate policies to the user, with the appropriate policies being viewable on the user's client computer.

Preferably, the server/machine associates a policy with a keyword. The keyword is a text expression identifying an item or group of items available for requisitioning. The expression can also identify a process that is related to purchasing, i.e., a peripheral or downstream process, such as returning an item. In a preferred embodiment, the search input comprises the keyword, and the appropriate policies are policies that are determined to be associated with the user's class information and with the keyword. The server/machine can provide one or more items (i.e., goods or services) that are related to the keyword to the user's client machine/computer for display, and provides the appropriate policies to the user for display on the user's client machine/computer. Preferably, the appropriate policies are displayed to the user on the client machine/computer no later than during the display of the one or more items related to the keyword in order to ensure that the user is made aware of any appropriate policies before the user performs any requisitioning actions for the item, such as submitting a requisition order for the item. While the present invention allows policies to be retrieved using keywords that identify an item, a group of items, and requisition-related processes, it is contemplated that policies can be found using any text an authorized user deems appropriate for associating with a policy. For example, an authorized user can associate a policy with the policy name or a phrase that is used within the policy, thereby allowing a user to find the policy using the policy name or phrase. The user's class (i.e., business group) is used to determine which policies are available to be found by the user.

In yet another embodiment, a method for creating a policy for use in a requisitioning system over a network is disclosed. The network is connected to a server, thereby allowing communication between the server and a plurality of requisitioning-users, with each requisitioning-user belonging to at least one of a plurality of classes. The method comprises the server providing a requisitioning system to the plurality of requisitioning-users, wherein the requisitioning-users can search for and requisition items from a plurality of items using the requisitioning system. The server stores each requisitioning-user's class information. A requisitioning-user's class information comprises the identification of each class to which the requisitioning-user belongs. An administrative-user accesses the server and generates a policy. The policy comprises one or more guidelines regarding the requisitioning of an item or peripheral/downstream processes related to the requisitioning of an item. The administrative-user assigns the generated policy to at least one of the plurality of classes, and the server stores the generated policy. The stored generated policy is associated with each class to which it is assigned and is viewable by every requisitioning-user belonging to the class with which it is associated.

In yet another embodiment, a program storage device is disclosed. The device is readable by a machine, and tangibly embodies a program of instructions executable by the machine to perform a method for creating a policy for use in a requisitioning system over a network. The network is connected to a server, thereby allowing communication between the server and a plurality of requisitioning-users. Each requisitioning-user belongs to at least one of a plurality of classes. The method comprises the machine providing a requisitioning system to the plurality of requisitioning-users, wherein the requisitioning-users can search for and requisition items from a plurality of items using the requisitioning system. The machine stores each requisitioning-user's class information. A requisitioning-user's class information comprises the identification of each class to which the requisitioning-user belongs. The machine generates a policy upon prompting from an administrative-user. The policy comprises one or more guidelines regarding the requisitioning of an item or a group of items. The machine assigns the generated policy to at least one of the plurality of classes upon prompting from the administrative-user. The machine stores the generated policy. The generated policy is associated with each class to which it is assigned and is viewable by every requisitioning-user belonging to the class with which it is associated.

Preferably, the administrating-user also assigns the generated policy to a keyword. In a preferred embodiment, the keyword is a text expression identifying an item or group of items available for requisitioning. The server/machine can receive search input from a requisitioning-user on a client machine/computer. The server/machine can process the search input and determine the appropriate policies in response to the processing of the search input. The appropriate policies are policies that are determined to be associated with the requisitioning-user's class information and with the keyword. The server/machine can provide the appropriate policies to the requisitioning-user, with the appropriate policies being viewable on the requisitioning-user's client machine/computer.

A single user is not necessarily limited to one role. Rather, he or she can be recognized by the server to perform the functions of several roles. For example, the same user can assume the role of an administrative-user that creates a policy, while also being able to assume the role of a requisitioning-user that searches the system for items and/or policies.

It is contemplated that the present invention can be implemented in a variety of ways and that certain steps detailed in this disclosure can be omitted or repeated based on the particulars of a given application.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

In a preferred embodiment, the steps of the present invention are embodied in machine-executable instructions. These instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, ROMs, RAMs, magnet or optical cards, or other type of media/machine-readable medium suitable for storing electronic instructions.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Figure 1:
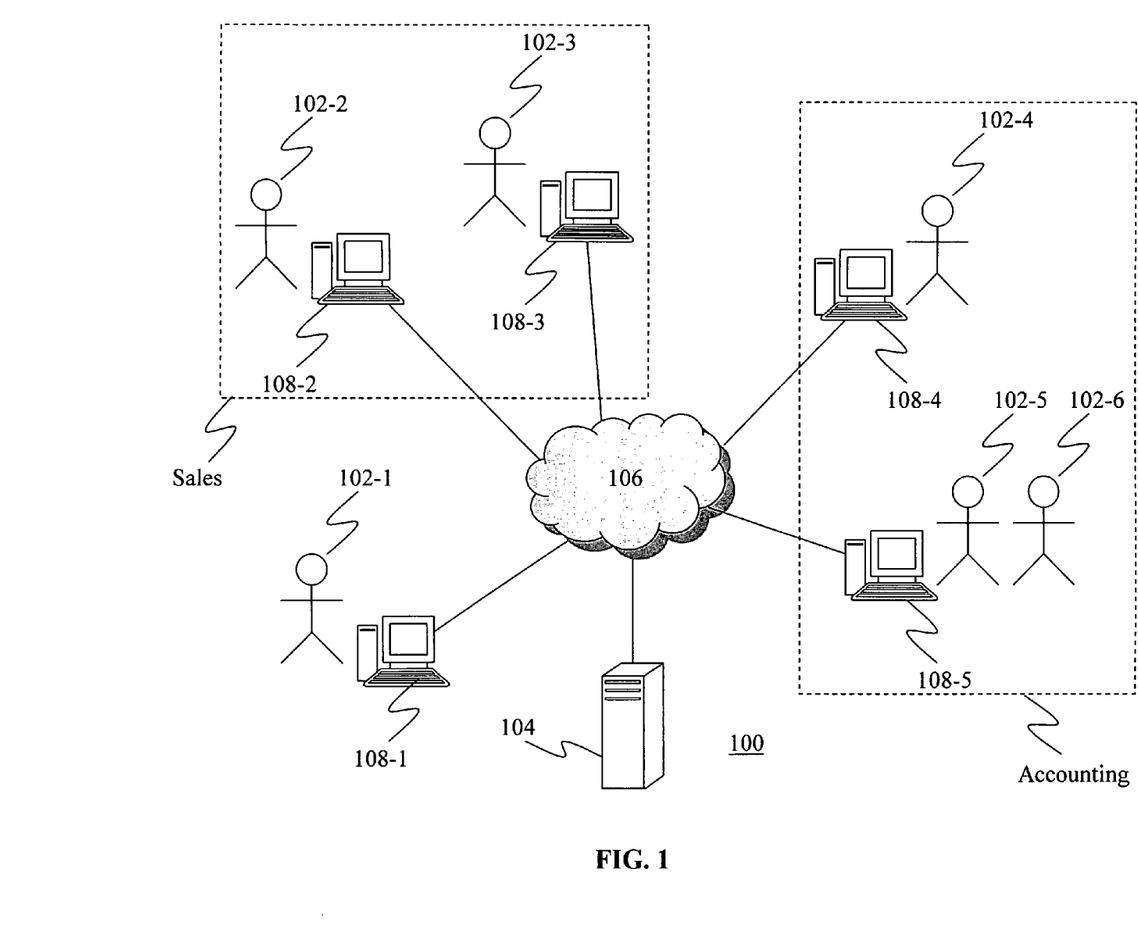
FIG. 1 illustrates an exemplary client-server environment in which the policy system of the present invention operates.

FIG. 1 illustrates an exemplary client-server environment 100, such as the World Wide Web, in which the policy system of the present invention operates. The architecture of this environment can follow a conventional client-server model. Users 102 use client machines 108 to communicate with server 104 through a network 106, such as the Internet. The client-server model is used to communicate information between client machines 108 and the server 104. Client machines 108 may be any type of computer having networking capabilities, including, but not limited to, desktops, laptops, and hand-held computing devices. The server 104 may be any type of server configured to store and operate a web-based application. In a preferred embodiment, the policy system of the present invention employs a web-based application stored on server 104. Users 102 can access the program through any client computer 108 connected to network 106. However, it is contemplated that the program may be stored, operated and accessed using a variety of other means as well.

Although the present invention may be applied to a variety of real world environments, it is ideally suited for organizations that want to effectively influence the purchasing decisions of their members. For example, a company can use the present invention to ensure that each employee is provided with the appropriate policy before requisitioning a specific item or class of items. In this scenario, these employees would be considered the users 102. Each of these users 102 is registered in the program on the server 104. Preferably, the server 104 stores information about the users 102. Such information can include, but is not limited to, the user's name, login ID, password, and information about the user's class. Class information is status information that can be used to determine which policies will be relevant to which users. A user's class can be determined based on the business group to which he or she belongs. For example, members of the sales department may belong to a sales class, while members of the accounting department may belong to an accounting class. Certain policies may apply only to members of the sales department, while other policies may apply only to members of the accounting department. Additionally, certain policies may apply to members of both departments. In this scenario, the sales department would be one class, with the members of the sales department having their user, class information reflecting such membership, and the accounting department would be another class, with the members of the accounting department having their user class information reflecting such membership. It is also contemplated that users can belong to several different classes, whether they be separate classes (such as sales and accounting) or classes with a hierarchical relationship (such as distinct seniority levels within the sales department).

In the present invention, classes can be defined using a variety of distinguishing criteria. In addition to the department and seniority information mentioned above, practically any other information used to distinguish between groups of users can be used to define classes, including but not limited to, regional information. For example, a user who works in the sales department of a company's California branch can be associated with a sales class (preferably comprising all users in the sales department) and with a California class (preferably comprising all users in the California branch), while a user who works in the accounting department of the company's New York branch can be associated with an accounting class (preferably comprising all users in the accounting department) and with a New York class (preferably comprising all users in the New York branch). It is contemplated that a policy can be associated with any number and any combination of classes.

As will be discussed in further detail below, the user's identification information is important, as it is used by the server 104 to identify the user 102 and his or her associated classes. In this fashion, it is not required that each user 102 communicate with the server 104 using his or her own distinct computer 108. Instead, multiple users 102 may use the same computer 108 to communicate with the server 104, as the server 104 is configured to distinguish each user 102 based on his or her user ID, such as a login ID, rather than the computer's IP address. For example, in FIG. 1, user 102-2 communicates with server 104 using computing machine 108-2 and user 102-3 communicates with server 104 using computing machine 108-3. However, user 102-5 and user 102-6 both communicate with server 104 using computing machine 108-5. Even though both users 102-5 and 102-6 use the same computing machine 108-5, the server 104 is able to distinguish between the two by requiring each user's login ID in order to gain access to the system. As can be seen in FIG. 1, users 102-2 and 102-3 belong to the sales department, while users 102-4, 102-5 and 102-6 belong to the accounting department. Each user's class information is stored on the server and can be retrieved based on the user's ID.

Setup and maintenance of the user database and other aspects of the server 104 can be restricted to one or more system administrators. In this case, the system administrator would be responsible for adding an employee as a user to the server, removing a user, modifying a user's profile (e.g., changing the user's login ID or class information), creating a policy to be stored on the server, removing an existing policy, and/or modifying an existing policy. In a preferred embodiment, access to the server for performing such actions can be restricted to only a system administrator by requiring that the system administrator log onto the server using a confidential password. In FIG. 1, user 102-1 is an administrative-user who is authorized to conduct such operations.

The term "user" is applied in a variety of situations in this disclosure and can be interpreted to apply to several different types of people that use the program of the present invention and have different and sometimes overlapping roles, responsibilities and capabilities. The server is configured to recognize and apply these different and overlapping roles, responsibilities and capabilities in enabling the users to perform certain operations, such as the operations discussed above. An administrative-user, such as a supervisor, may also be registered with the server to act as a requisitioning-user. Such a user would be able requisition items and view the appropriate policies, as well as perform certain administrative functions. Other users may have more limited and restricted roles. In FIG. 1, users 102-2 to 102-6 are requisitioning-users who only have the authority and capability to navigate through the requisition system and view the appropriate policies. They are not able to perform the maintenance operations available to administrative-user 102-1.

Figure 2:
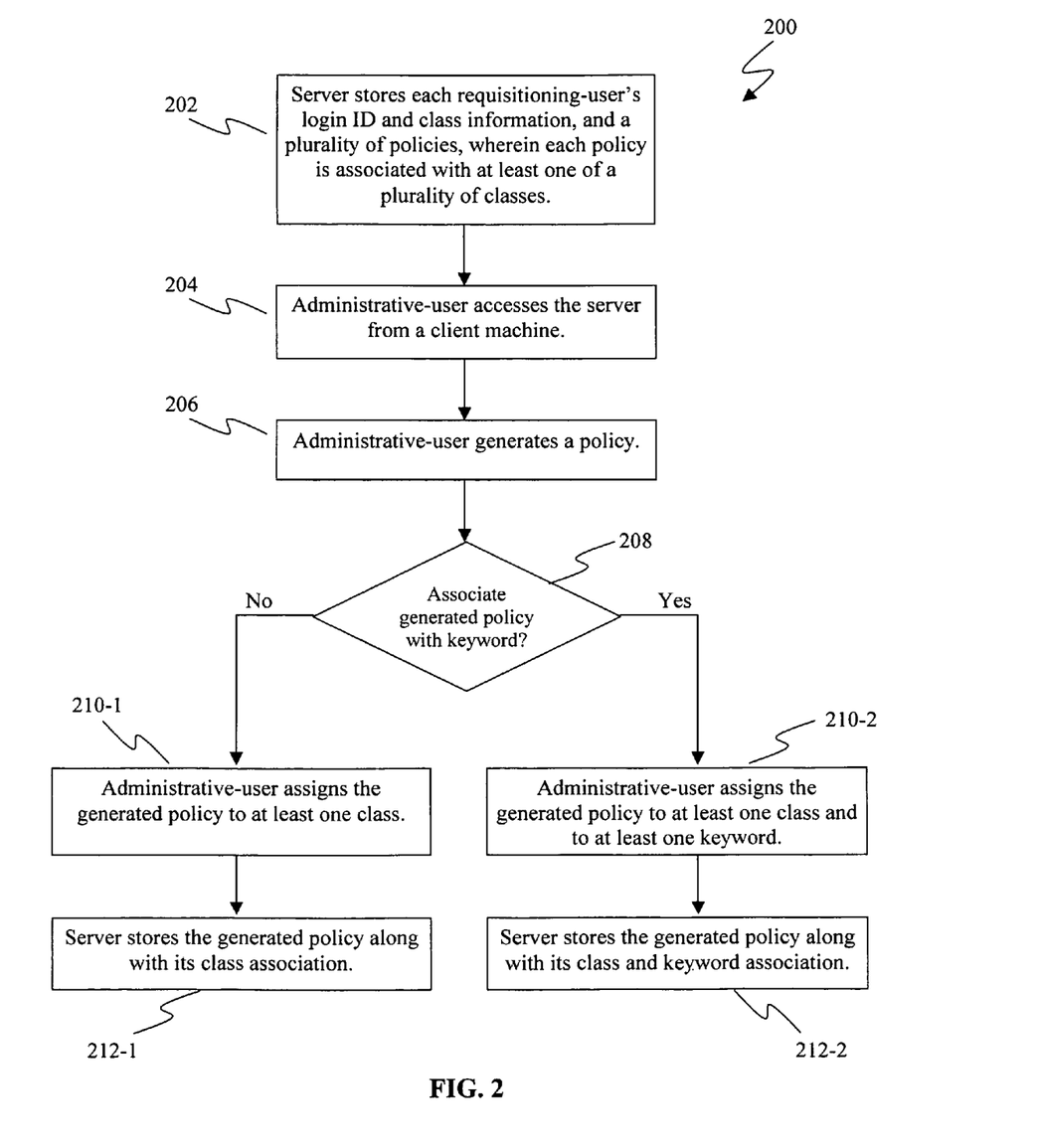
FIG. 2 is a flowchart illustrating an exemplary method for creating policies to be used in a requisitioning system in accordance with the principles of the present invention.

FIG. 2 is a flowchart illustrating an exemplary method 200 for creating policies to be used in a requisitioning system on a server in accordance with the principles of the present invention. The system is accessible to a plurality of requisitioning-users, with each requisitioning-user having a login ID and belonging to at least one of a plurality of classes.

At step 202, the server stores each requisitioning-user's login ID and class information. The server also stores a plurality of policies. Each policy is associated with at least one of the classes and comprises one or more guidelines regarding the requisitioning of an item. It is contemplated that a policy can be associated with more than one of the plurality of classes. For example, a policy may be associated with both a sales class and an accounting class, or the policy may be associated with both a junior class, representing junior level employees, and a supervisor class, representing supervisors. In a preferred embodiment, the class includes certain requisitioning-users, while excluding other requisitioning-users. However, it is contemplated that the present invention can include company-wide policies that are associated, and therefore available, to every member of the company (i.e., every user).

At step 204, an administrative-user accesses the system on the server from a client machine. Such access is preferably achieved by the administrative-user providing a login ID and password to the server. This administrative-user is preferably someone in the organization who has the requisite minimum level of authority, such as a supervisor in the purchasing department.

At step 206, the administrative-user generates a policy. It is contemplated that the policy can be created in a variety of ways. However, in a preferred embodiment, the administrative-user can employ an online text editor provided by the system. The editor can comprise a box where the administrative-user can paste in HTML, a Word document, other text, images, and/or links.

At step 208, the administrative-user determines whether or not the generated policy should be associated with one or more keywords, such as a specific item name (e.g., iPhone) or a specific item grouping (e.g., cell phone). The keyword is any term that can be input or selected by a requisitioning-user to find an item or a policy. In a preferred embodiment, the requisitioning system employs tagging as a navigation tool. Tagging is a method for ad hoc querying and search optimization based on user-defined words or phrases, where users can tag various elements/objects, such as catalog items, suppliers, invoices, and even policies. By tagging an element with a user-defined word or phrase, referred to as a tag, users can subsequently bring up that element by searching on or selecting that tag.

If the administrative-user determines that the generated policy should not be associated with a keyword, then the administrative-user assigns the generated policy to at least one class at step 210-1. In assigning the generated policy to a certain class or set of classes, the administrative-user is informing the system of for who this policy is relevant and who will be able to view it (and who will not be able to view it). It is contemplated that the generated policy can be assigned to a global class so that it is viewable to every user, not just users within certain departments, seniority levels, regions, or other restrictive classes. The server then stores the generated policy at step 212-1, along with its class association, thus enabling the policy to be subsequently retrieved upon prompting by a requisitioning-user belonging to an associated class.

If the administrative-user determines that the generated policy should be associated with a keyword, then the administrative-user assigns the generated policy to at least one class and to at least one keyword at step 210-2. In assigning the generated policy to a certain class or set of classes, the administrative-user is informing the system of for who this policy is relevant and who will be able to view it (and who will not be able to view it). As mentioned above, the generated policy can be assigned to a global class. The server then stores the generated policy at step 212-2, along with its class association and its keyword association, thus enabling the policy to be subsequently retrieved upon prompting by a requisitioning-user belonging to an associated class who provides search input that matches the keyword association. Such input can include, but is not limited to, entering a keyword or selecting a link.

Once the policy is generated and stored on the server, it is then available on the system by the appropriate requisitioning-users and it is incorporated into the searching capabilities of the requisitioning system so that a requisitioning-user will be provided with it if he or she is searching for relevant policies, or even if he or she is simply searching for items without any intention of looking at policies. It is contemplated that an authorized user can subsequently assign additional keywords to or remove assigned keywords from a generated policy.

Figure 3:
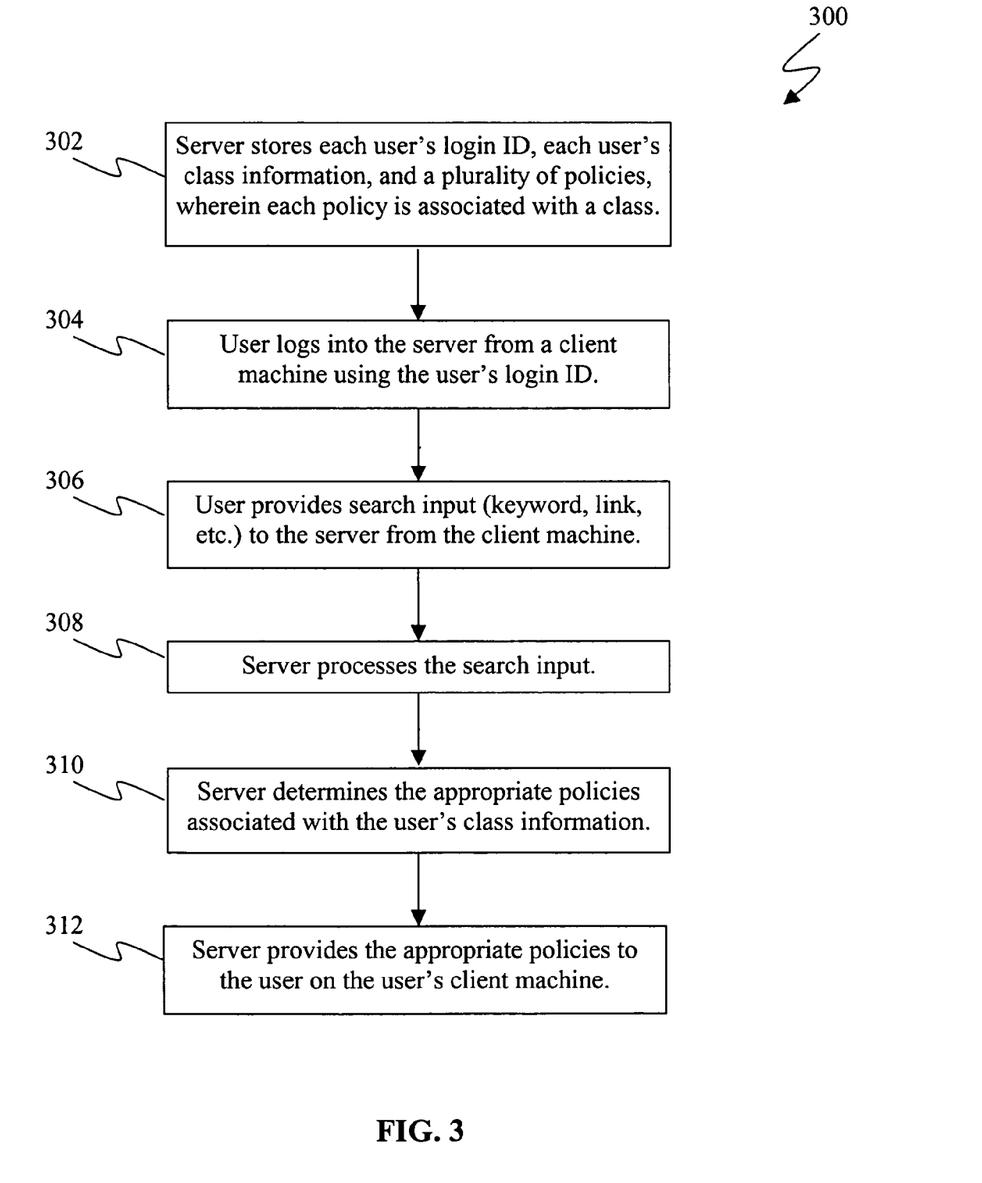
FIG. 3 is a flowchart illustrating an exemplary method for providing a user with the appropriate policies in accordance with the principles of the present invention.

FIG. 3 is a flowchart illustrating an exemplary method 300 for providing a user with the appropriate policies in accordance with the principles of the present invention.

At step 302, the server stores each requisitioning-user's login ID and class information. The server also stores a plurality of policies. Each policy is associated with at least one class and comprises one or more guidelines regarding the requisitioning of an item. As discussed above, it is contemplated that a policy can be associated with more than one class. In a preferred embodiment, the class includes certain requisitioning-users, while excluding other requisitioning-users.

At step 304, a requisitioning-user logs into the system on the server from a client machine. Preferably, the requisitioning-user performs this operation by providing a login ID and password to the server.

At step 306, the requisitioning-user provides a search input to the server from the client machine. It is contemplated that this input can be provided in a variety of forms. For example, the user can enter a keyword. Alternatively, the user can click on a link. The search input can comprise a tag, such as those discussed above. The input can include an item name or grouping. Alternatively, the input can be an indication that the user wishes to view all the policies relevant to himself or herself. These options will be discussed further below with respect to FIG. 4.

At step 308, the server receives and processes the search input. In response to processing the search input, the server determines the appropriate policies based on the user's class information at step 310.

Finally, at step 312, the server provides the appropriate policies to the user. These policies are viewable to the user on the user's client machine. In a preferred embodiment, if the user is searching for an item or an item group, these policies are presented to the user either before or along with the presentation of the user's search results, thereby forcing the user to be aware of the appropriate policies before submitting a requisition through the system. Such presentation may occur in the same window as the search results or a separate window, so long as the user is prevented from submitting a requisition order before being made aware of the appropriate policies.

Figure 4:
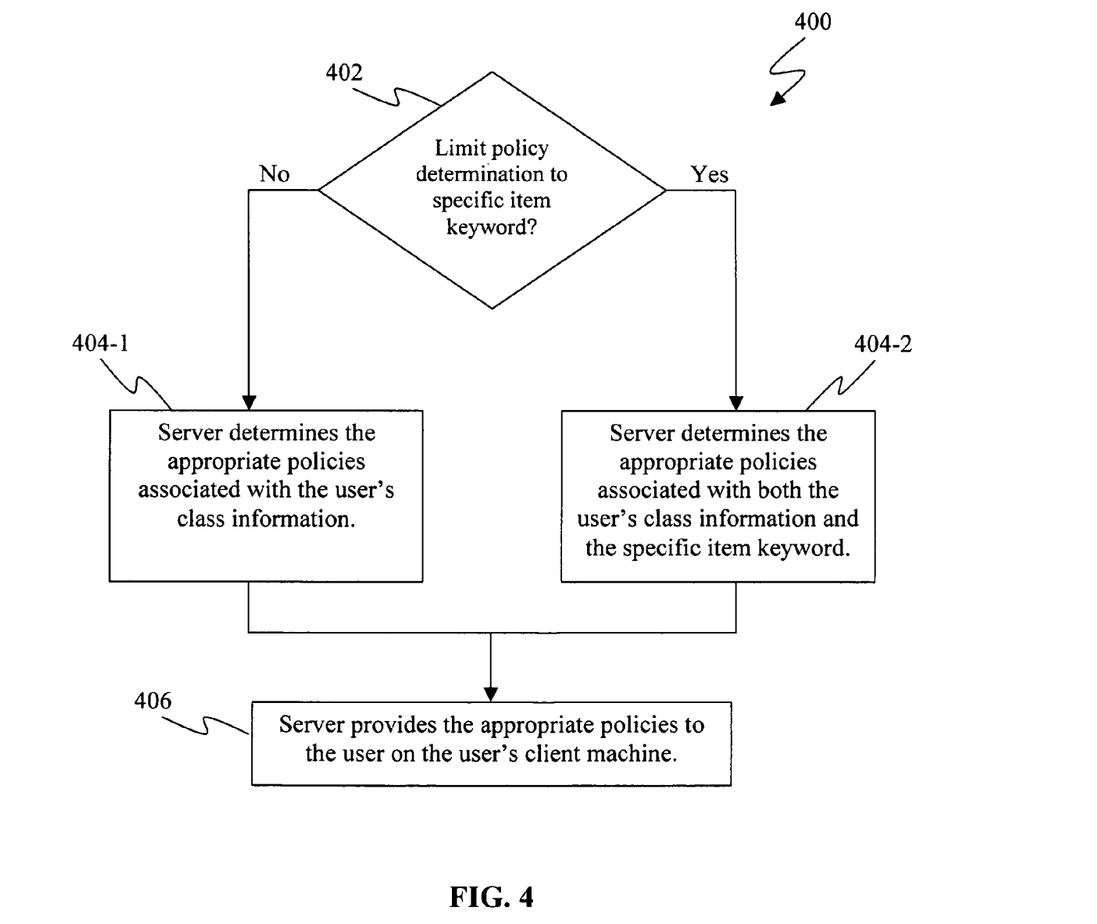
FIG. 4 is a flowchart illustrating an exemplary method for determining the appropriate policies to provide to the user in accordance with the principles of the present invention.

FIG. 4 is a flowchart illustrating an exemplary method 400 for determining the appropriate policies to provide to the user in accordance with the principles of the present invention.

At step 402, the server determines whether or not it should narrow its presentation of appropriate policies based on a specific item keyword. Such a determination helps distinguish between a situation where the user wants to view all of the policies relevant to himself or herself (i.e., only policies associated with his or her class/classes), and a situation where the user wants to view the policies relevant to himself or herself with respect to a specific item or item group. In a preferred embodiment, the system makes such a determination based on the search input provided by the user. For example, a user clicking on a link that indicates a display of all policies can lead the system to determine that the user wants to view all of the policies available to his or her class status, whereas a user typing in an item-related keyword, such as "cell phone," can lead the system to determine that the user wants to view only the policies available to his or her class status that are relevant to a specific item or item group.

If a user wants to view all of the policies relevant to himself or herself, regardless of the item or item group, then the server determines the appropriate policies associated with the user's class information at step 404-1. The server then provides the appropriate policies to the user on the user's client machine at step 406.

If a user wants to view the policies relevant to himself or herself with respect to a specific item or item group, then the server determines the appropriate policies associated with both the user's class information and the specific item keyword provided by the user, at step 404-2. The server then provides the appropriate policies to the user on the user's client machine at step 406. One example of this type of situation would be if a user logs into the system and performs a search on the word "Apple." In addition to providing the user with items that the company has deemed related to the word "Apple," the system would also provide any associated policies to accompany the presentation of items. One example of such a policy could be a text expression displayed above the items that states, "we do not buy Apple products" or "you must be a senior level associate to purchase an Apple product." Such a display may also be prompted by the user selecting a clickable tag, such as "Apple," that serves as a link.

Preferably, one or more administrative users are responsible for policy management operations, such as adding/removing policies, editing policies, and adding/removing/editing keywords. However, it is contemplated that the assignment of keywords to policies may be available to users other than just administrative users. In some embodiments, a standard user, having no official administrative designation, can also assign a keyword to be associated with a policy to which he or she has access. For example, if a standard user is viewing a policy that an administrative user has already tagged with the term "Apple," the standard user could tag the same policy with the term "Mac." The policy would then be provided to a user upon selecting either "Apple" or "Mac" as search input (e.g., in a keyword search, drop-down menu, HTML link, etc.).

The present invention incorporates policy information into a business procurement application in such an efficient manner as to maximize each policy's influence on guiding people to follow the organization's directives. The scope of each policy can be managed by administrative-users, where one user may see a policy because it is directed towards him (i.e., his class), but another user may not see a policy because it is not directed towards him (i.e., outside his class). A user can view all of the policies that are relevant to him, or narrow the field of policies to only those that are both related to him and related to a user-specified keyword. Additionally, by presenting any relevant policies to the user before or during presentation of item search results, the present invention requires that a user be made aware of any appropriate policies before requisitioning any of the resulting items or performing any peripheral/downstream processes with respect to the items, thereby maximizing the influence of the policies.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of utilizing a policy system in a requisitioning of items over a network, the network connected to a server, thereby allowing communication between the server and a plurality of users, each user having a login ID and belonging to at least one of a plurality of classes, the method comprising the steps of:

the server providing a requisitioning system to the plurality of users, wherein the users can search for and requisition items from a plurality of items using the requisitioning system;

the server storing each user's login ID, each user's class information, and a plurality of policies, wherein a user's class information comprises an identification of each class to which the user belongs, and each policy is associated with at least one class and comprises one or more guidelines regarding the requisitioning of an item;

the server logging in the user using the user's login ID;

the server receiving and processing search input provided by the user from a client machine;

the server determining appropriate policies in response to the processing of the search input, wherein the appropriate policies are policies that are determined to be associated with one or more classes to which the user belongs and relevant to at least one item to be displayed; and the server causing the at least one item to be concurrently displayed with the appropriate policies that were determined to be associated with the one or more classes and relevant to the at least one item, the appropriate policies being viewable on the client machine;

wherein the at least one item is displayed without a particular policy associated with a particular class if the user does not belong to the particular class;

wherein the server comprises one or more programmed computer components.

2. The method of claim 1, wherein the server associates a policy with a keyword, the keyword being a text expression identifying an item or group of items available for requisitioning.

3. The method of claim 2, wherein:
the search input comprises the keyword; and
the appropriate policies are policies that are determined to be associated with the user's class information and with the keyword.

4. The method of claim 3, wherein
the at least one item comprises an item related to the keyword.

5. The method of claim 4, wherein the step of receiving and processing the search input includes the server receiving entry, by the user, of the keyword.

6. The method of claim 4, wherein the step of receiving and processing the search input includes the server receiving selection, by the user, of a link, the link comprising the keyword.

7. A program storage device readable by a machine, tangibly embodying a program of instructions executable by the machine to perform a method for utilizing a policy system in a requisitioning of items over a network, the network connected to a server, thereby allowing communication between the server and a plurality of users, each user having a login ID and belonging to at least one of a plurality of classes, the method comprising:

the machine providing a requisitioning system to the plurality of users, wherein the users can search for and requisition items from a plurality of items using the requisitioning system;

the machine storing each user's login ID, each user's class information, and a plurality of policies, wherein a user's class information comprises an identification of each class to which the user belongs, and each policy is associated with at least one class and comprises one or more guidelines regarding the requisitioning of an item;

the machine receiving search input from a user logged into the machine from a client computer;

the machine processing the search input;

the machine determining appropriate policies in response to the processing of the search input, wherein the appropriate policies are policies that are determined to be associated with one or more classes to which the user belongs and relevant to at least one item to be displayed; and the machine causing the at least one item to be concurrently displayed with the appropriate policies that were determined to be associated with the one or more classes and relevant to the at least one item, the appropriate policies being viewable on the client computer;

wherein the at least one item is displayed without a particular policy associated with a particular class if the user does not belong to the particular class.

8. The device of claim 7, wherein the method further comprises the machine associating a policy with a keyword, the keyword being a text expression identifying an item or group of items available for requisitioning.

9. The device of claim 8, wherein:
the search input comprises the keyword; and
the appropriate policies are policies that are determined to be associated with the user's class information and with the keyword.

10. The device of claim 9, wherein the at least one item comprises an item related to the keyword.

11. A method of creating a policy for use in a requisitioning system over a network, the network connected to a server, thereby allowing communication between the server and a plurality of requisitioning-users, each requisitioning-user belonging to at least one of a plurality of classes, the method comprising the steps of:

the server providing a requisitioning system to the plurality of requisitioning-users, wherein the requisitioning-users can search for and requisition items from a plurality of items using the requisitioning system;

the server storing each requisitioning-user's class information, wherein a requisitioning-user's class information comprises an identification of each class to which the requisitioning-user belongs;

upon prompting from an administrative user, the server generating a policy, wherein the policy comprises one or more guidelines regarding the requisitioning of an item or a group of items;

the server assigning the generated policy to a keyword and at least one of the plurality of classes; and the server storing the generated policy, wherein the generated policy is associated with each class to which the policy is assigned and is viewable by any requisitioning-user that accesses the requisitioning system, that belongs to the class with which the policy is associated, and in response to a search for items using the keyword;

wherein the generated policy is not viewable by any requisitioning-user that does not belong to the class with which the policy is associated;

wherein the server comprises one or more programmed computer components.

12. The method of claim 11, wherein the keyword is a text expression identifying an item or group of items available for requisitioning.

13. The method of claim 12, further comprising the steps of:

the server receiving search input from a requisitioning-user on a client machine;

the server processing the search input;

the server determining appropriate policies in response to the processing of the search input, wherein the appropriate policies are policies that are determined to be associated with the requisitioning-user's class information and with the keyword; and the server providing the appropriate policies to the requisitioning-user, the appropriate policies being viewable on the client machine.

14. The method of claim 13, wherein the step of the server receiving search input includes the server receiving, from the user, either the keyword as entered on the client machine or a selected link, wherein the link comprises the keyword.

15. The method of claim 11, further comprising:
the server allowing the requisitioning-user to access the generated policy in response to a determination that the requisitioning-user belongs to a class that the server assigned to the generated policy.

16. A program storage device readable by a machine, tangibly embodying a program of instructions executable by the machine to perform a method for creating a policy for use in a requisitioning system over a network, the network connected to a server, thereby allowing communication between the server and a plurality of requisitioning-users, each requisitioning-user belonging to at least one of a plurality of classes, the method comprising the steps of:

the machine providing a requisitioning system to the plurality of requisitioning-users, wherein the requisitioning-users can search for and requisition items from a plurality of items using the requisitioning system;

the machine storing each requisitioning-user's class information, wherein a requisitioning-user's class information comprises an identification of each class to which the requisitioning-user belongs;

the machine generating a policy upon prompting from an administrative-user, wherein the policy comprises one or more guidelines regarding the requisitioning of an item or a group of items;

the machine assigning the generated policy to a keyword and at least one of the plurality of classes upon prompting from the administrative-user; and the machine storing the generated policy, wherein the generated policy is associated with each class to which the policy is assigned and is viewable by any requisitioning-user that accesses the requisitioning system, that belongs to the class with which the policy is associated, and in response to a search for items using the keyword;

wherein the generated policy is not viewable by any requisitioning-user that does not belong to the class with which the policy is associated.

17. The device of claim 16, wherein the keyword is a text expression identifying an item or group of items available for requisitioning.

18. The device of claim 17, wherein the method further comprises the steps of:
- the machine receiving search input from a requisitioning-user on a client computer;
- the machine processing the search input;
- the machine determining appropriate policies in response to the processing of the search input, wherein the appropriate policies are policies that are determined to be associated with the requisitioning-user's class information and with the keyword; and
- the machine providing the appropriate policies to the requisitioning-user, the appropriate policies being viewable on the client computer.

19. The device of claim 18, wherein the step of the machine receiving search input includes the machine receiving, from the user, either the keyword as entered on the client computer or a selected link, wherein the link comprises the keyword.

20. The device of claim 16, wherein the method further comprises the steps of:
- the machine allowing the requisitioning-user to access the generated policy in response to a determination that the requisitioning-user belongs to a class that the machine assigned to the generated policy.

* * * * *